United States Patent
Franzreb

[15] 3,669,184
[45] June 13, 1972

[54] APPARATUS FOR HEATING AND COOLING A BUILDING

[72] Inventor: John K. Franzreb, Route 2, P. O. Box 252, Kingston, Tenn. 37763

[22] Filed: July 22, 1970

[21] Appl. No.: 57,083

[52] U.S. Cl.................................................165/50, 62/304
[51] Int. Cl.........................................................F24f 3/00
[58] Field of Search.....................165/16, 22, 50, 60; 62/304, 62/316

[56] References Cited

UNITED STATES PATENTS 2,107,268   2/1938   Avery et al. .............................165/16

Primary Examiner—Charles Sukalo
Attorney—John N. Randolph

[57] ABSTRACT

An apparatus for productively utilizing the heat from waste liquids discarded by industrial plants, such as power plants, for heating and cooling buildings, such as, greenhouses, and to prevent thermal pollution of bodies of water, such as rivers and lakes, into which the waste liquid is ultimately discharged at a low temperature. For heating a building, the heated liquid is discharged directly onto the building roof at the ridge thereof to flow down the sloping roof sides and is then deflected against the side walls of the building for heating the roof and said walls. The liquid is then collected in troughs for recycling through the industrial plant and back to the apparatus, or may be discharged to waste. For cooling the building the heated liquid is discharged by the apparatus upwardly from above the roof to effect evaporative cooling of the droplets. The cool liquid falling on the roof flows down its sloping sides for cooling the building, and is thereafter cascaded over louvers for recooling the liquid, heated by contact with the roof, before the liquid is discharged into the trough from which it can be recycled or carried off to waste.

10 Claims, 8 Drawing Figures

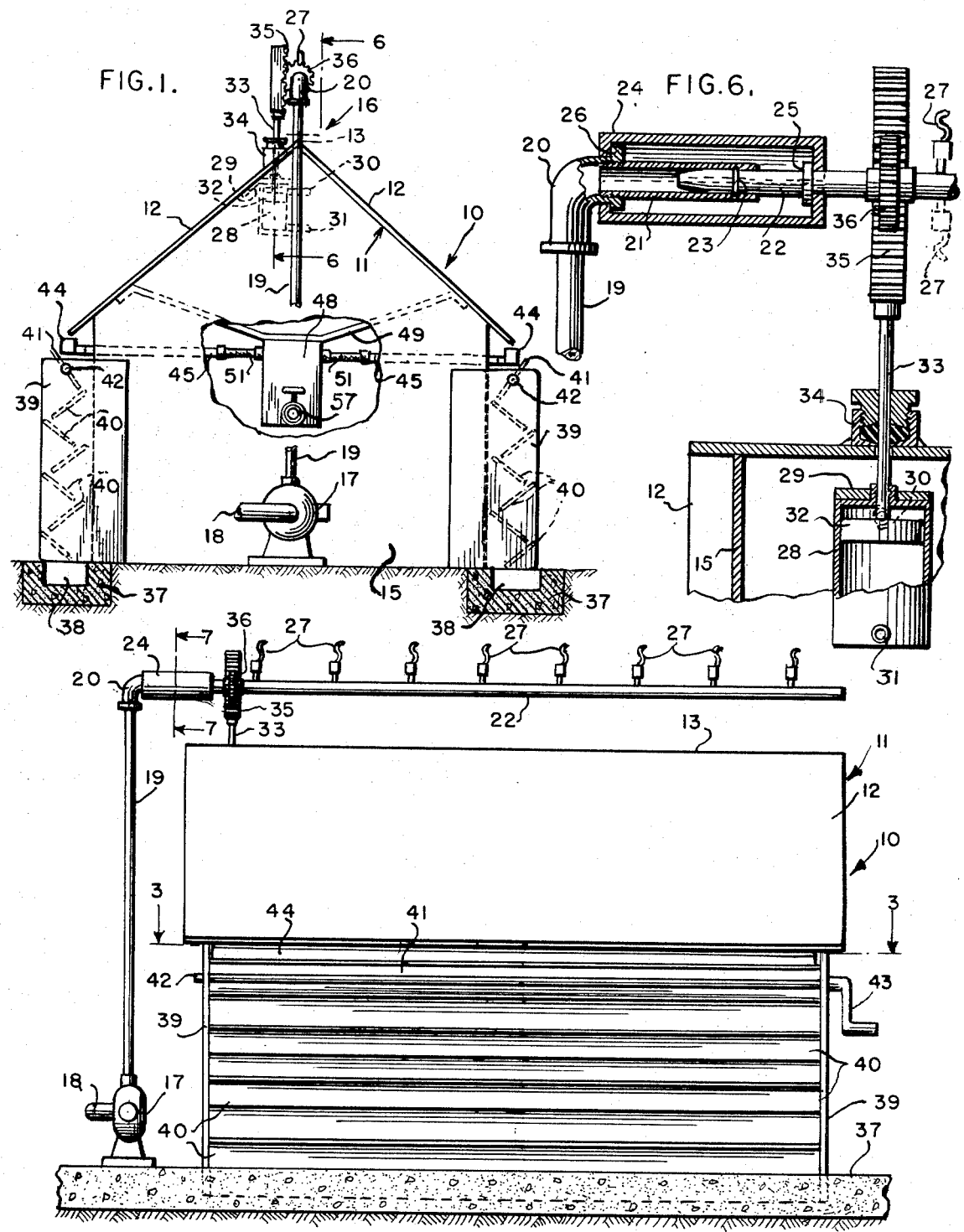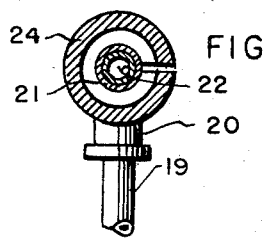

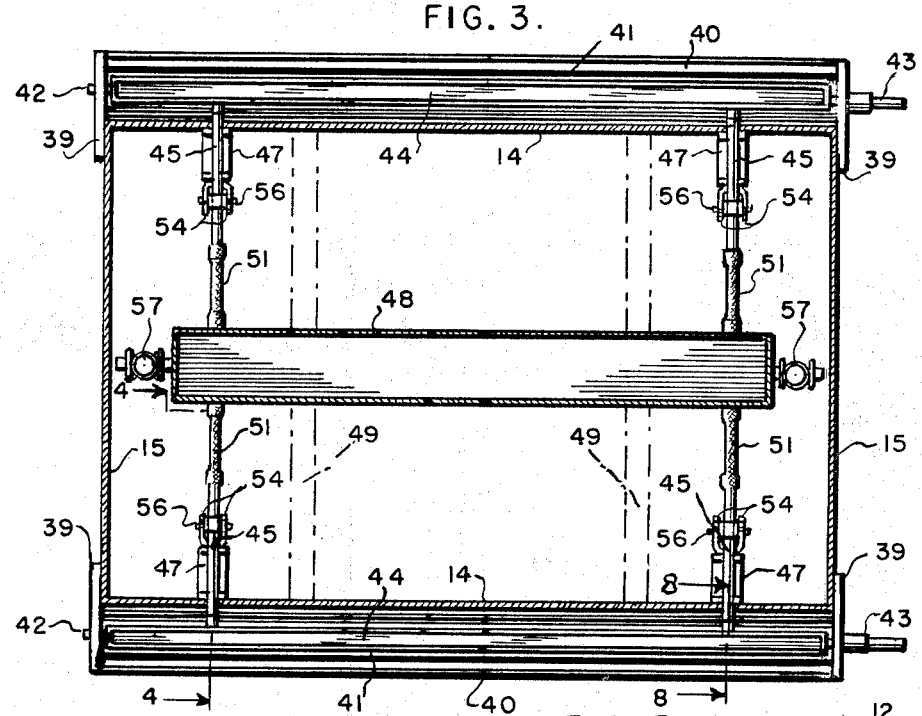
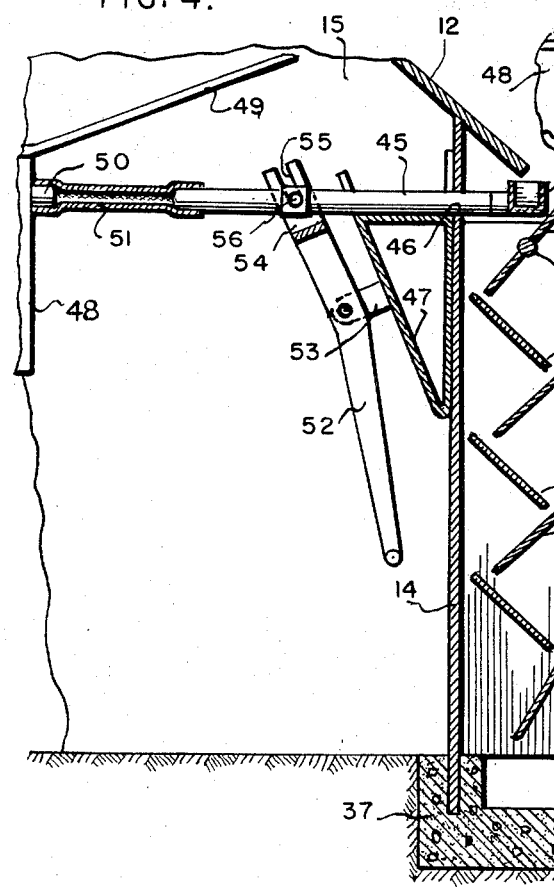
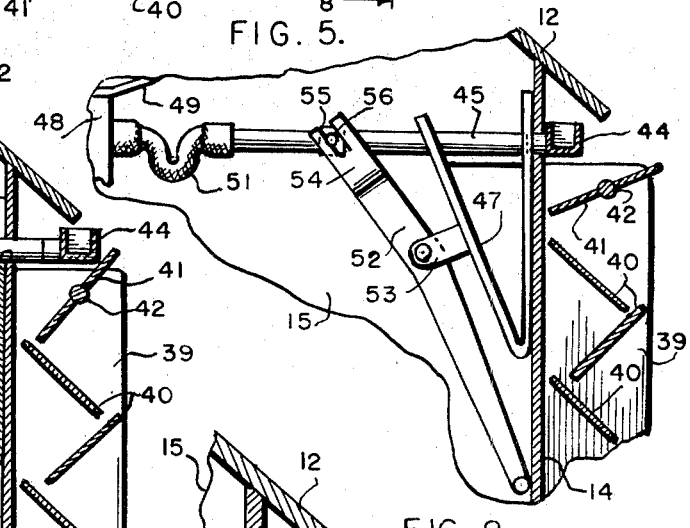
INVENTOR
JOHN K. FRANZREB

APPARATUS FOR HEATING AND COOLING A BUILDING

It is a primary object of the present invention to provide an apparatus which may be effectively employed for utilizing the heat from waste liquids of industrial plants for heating or cooling buildings and to prevent thermal pollution of bodies of water into which such liquids may be ultimately discharged to waste.

Another object of the invention is to provide such an apparatus wherein the waste liquids may be utilized in part for fire protection, chemical processing, or for irrigation purposes in connection with greenhouses.

Other objects of the invention are to provide an apparatus which when employed for temperature control of a greenhouse will substantially reduce the operating costs for fuel and electricity for heating, cooling and humidity control; which will enable the use of a single, rather than a double covering of glazing material to provide thermal insulation; which will materially simplify interior humidity control; and, which will prevent the accumulation of snow and ice on the roof, enabling lighter roofing construction.

Various other objects and advantages of the invention will hereinafter become more fully apparent from the following description of the drawings, illustrating a presently preferred embodiment thereof, and wherein:

BRIEF DESCRIPTION OF THE DRAWINGS

FIG. 1 is an end elevational view, partly broken away and with certain parts omitted, looking from left to right of FIG. 2, showing the apparatus applied to a greenhouse;

FIG. 2 is a side elevational view thereof looking from right to left of FIG. 1;

FIG. 3 is a horizontal sectional view, taken substantially along a plane as indicated by the line 3—3 of FIG. 2;

FIG. 4 is an enlarged fragmentary transverse vertical sectional view, taken substantially along a plane as indicated by the line 4—4 of FIG. 3;

FIG. 5 is a fragmentary view similar to FIG. 4 but illustrating a different position of certain of the parts;

FIG. 6 is an enlarged fragmentary vertical sectional view taken substantially along the line 6—6 of FIG. 1;

FIG. 7 is an enlarged fragmentary cross sectional view, taken substantially along a plane as indicated by the line 7—7 of FIG. 2, and FIG. 8 is an enlarged fragmentary vertical sectional view, taken substantially along a plane as indicated by the line 8—8 of FIG. 3.

DESCRIPTION OF THE PREFERRED EMBODIMENT

Referring more specifically to the drawings, a building 10, such as a greenhouse, having a roof 11 including sides 12, which slope downwardly from the ridge 13 thereof, and corresponding side walls 14 and end walls 15, as illustrated in the drawings to show one application of the heating and cooling apparatus, designated generally 16, and comprising the invention.

The apparatus 16 includes a pump 17 mounted beyond one end wall 15 and having an inlet conduit 18 connected thereto and leading from a source of supply, not shown, of a heated liquid, such as the waste outlet of an industrial plant. The pump 17 has an outlet conduit 19 extending upwardly therefrom to one end of a reducing elbow 20. A short horizontally disposed pipe 21 has one end threadedly connected to the opposite end of the elbow 20. One end of a header pipe 22 is rotatively mounted in the opposite end of the pipe 21, and the connection between the pipes 21 and 22 is sealed by an elastic ring 23. A split thrust retaining yoke 24 fits over a portion of the elbow 20 and a portion of the pipe 22 and encloses the pipe 21. A thrust collar 25, carried by the pipe 22, abuts the inner side of the end of the yoke 24, disposed remote from the elbow 20, to combine with a flange 26 of the elbow to prevent displacement of the pipe 22 outwardly of the pipe 21.

As seen in FIG. 2, the header pipe 22 at spaced points along its length is provided with laterally projecting spray nozzles 27. The pipe 22 extends longitudinally of the roof 11 and is disposed above and spaced from the ridge 13 thereof.

A double acting air cylinder 28 is mounted on the under side of the roof 11 by a bracket 29, as seen in dotted lines in FIG. 1, and has conduits 30 and 31 communicating with the ends thereof for supplying compressed air thereto or for bleeding air therefrom. A piston 32 is slidably mounted in the cylinder 28 between the conduits 30 and 31 and has a piston rod 33 extending upwardly therefrom and from the cylinder 28 slidably through a seal 34 formed on one of the roof sides 12, as best seen in FIG. 6. A rack 35 is secured to and extends upwardly from the rod 33, above the seal 34, and meshes with a pinion 36 secured to the pipe 22. By pressurizing the upper end of the cylinder 28 through the conduit 30 and bleeding the lower end thereof through the conduit 31, the piston 32 is forced downwardly to displace the rod 33 and rack 35 downward. Downward movement of the rod 33, until its movement is interrupted by engagement with the seal 34, turns the pinion 36 and pipe 22 ½ a revolution to swing the nozzles 27 from their positions above the pipe 22 to positions therebeneath, as illustrated in full and dotted lines, respectively, in FIG. 6. Pressurizing the lower end of the cylinder 28 through the conduit 31 while bleeding said cylinder through the conduit 30 will return the rod 33 and rack 35 to their positions of FIG. 6 to again position the nozzles 27 above the pipe 22.

The foundation of the building 10 includes concrete sill members 37 on which the side walls 14 rest and which have troughs or channels 38 extending longitudinally thereof and spaced outwardly from the walls 14. As seen in FIG. 3, flange members 39 are secured to the end walls 15 and extend outwardly beyond both ends of the side walls 14. Each pair of longitudinally aligned flanges 39 supports a plurality of stationary louvers 40 which extend therebetween and which are disposed in vertically spaced apart relation to one another. Adjacent louvers 40 are inclined in opposite directions so that a liquid falling upon the uppermost louver 40 cascades successively over each of the louvers disposed therebeneath and discharges from the bottommost louver into the channel 38. A baffle or deflector 41 is mounted above the uppermost louver 40 of each set on a rod 42 the ends of which are journaled in the flanges 39, and one of said ends may be provided with a crank 43, FIG. 3, for turning the baffle.

A drain gutter 44 is disposed beneath the eave of each roof side 12 and extends substantially from end to end thereof. Each drain gutter 44 is supported by two rigid conduits 45 which communicate therewith, as seen in FIG. 8, and which extend inwardly therefrom slidably through openings 46 of the wall 14. Each conduit 45 extends through and is supported by a bracket 47. The brackets are secured to the inner sides of the walls 14. A reservoir 48 is disposed within the greenhouse 10 between the walls 14 and is supported by suitable support members 49. Inlet nipples 50 of the reservoir 48 are connected to outlet ends of the conduits 45 by hoses or flexible conduits 51. Levers 52 are pivotally supported intermediate of their ends on ears 53 which extend inwardly from the brackets 47. Bifurcated upper ends 54 of the levers 52 straddle portions of the conduits 45 and have their furcations slotted as seen at 55 to receive pins 56 which extend laterally from the conduits 45, for a purpose which will hereinafter be described. The reservoir 48 may be provided with suitable valve controlled outlets 57.

With the parts of the apparatus 16 disposed in the positions as illustrated in FIGS. 1 to 3, said apparatus will function for cooling the building 10 and for supplying liquid to the reservoir 48, which liquid may be utilized for irrigation purposes within the greenhouse or for other functions.

The heated liquid, not shown, supplied to the pump 17 through the conduit 18, is forced upwardly into the header pipe 22 and discharged upwardly into the atmosphere from the nozzles 27. Evaporative cooling occurs as the water after being discharged upwardly falls as droplets on the roof sides 12, near atmospheric wet bulb temperature. The cool liquid flowing down the roof sides 12 gathers heat from the roof by contact conduction and heat rising within the building flows to the cooled roof and is dissipated thereby. The liquid flowing off of the eaves of the roof sides 12 discharges into the gutters 44 and is conveyed through conduits 45 and 51 into the tank 48.

When there is no need for replenishing the supply of liquid in the reservoir 48, the levers 52 are swung from their positions of FIG. 4 to their positions of FIG. 5 for retracting the conduits 45 and gutters 44 inwardly to their positions of FIG. 5. With the baffles 41 positioned as illustrated in FIGS. 1, 2 and 3, the liquid after having been cooled by being sprayed into the atmosphere and falling on the roof 11 is heated by contact with the roof sides 12 in flowing downwardly thereover. This liquid flows off of the roof eaves onto the baffles 41 which are inclined so as to deflect liquid onto the uppermost louvers 40. The liquid is cooled in cascading over the louvers 40 and before it discharges into the channels 38. From the channels 38, the liquid can be returned by suitable means, not shown, to the industrial plant to be reused and recycled therethrough and thereafter returned to the pump 17 and recycled through the apparatus 16, as heretofore described. If desired, the liquid may be discharged from the troughs 38 to waste in a river, lake or other body of water. As the liquid will have been cooled in cascading over the louvers 40 it will be approximately at atmospheric temperature when it is discharged to waste so as not to cause thermal pollution.

For heating the building in cold weather, the pipe 22 is rotated a half revolution, as heretofore described, for positioning nozzles 27 therebeneath, as seen in dotted lines in FIG. 6, so that the hot liquid will be discharged directly from the nozzles onto the roof 11 to flow down and heat the roof sides 12. When the gutters 44 are retracted and the baffles 41 are disposed as seen in FIG. 5, the liquid after flowing over and heating the roof 11 is discharged from its sides 12 onto the baffles 41 and is deflected thereby against the outer sides of the walls 14 for heating said walls as the liquid flows down the walls without contacting the louvers 40. The liquid from the walls 14 is collected in the troughs 38 where it may be recycled or discharged as waste, sufficiently cool so as not to cause thermal pollution. Thus, the building 10 will be heated through the roof 11 and walls 14.

Various other means may be employed for effecting rotation of the header pipe 22, and numerous other modifications and changes are contemplated and may be resorted to without departing from the function or scope of the invention.

I claim as my invention:

1. An apparatus for heating and cooling a building comprising a conduit system for receiving a heated liquid from a supply source, a plurality of spray nozzles constituting the outlet of the conduit system and disposed above the longitudinal extent of the sloping roof of a building, and means adjustably positioning the nozzles to face either upwardly or downwardly whereby the liquid discharged therefrom onto the roof will either cool or heat the roof.

2. An apparatus as in claim 1, wherein said conduit system includes a header pipe disposed longitudinally above a topmost portion of the roof, means swivelly supporting said header pipe, said spray nozzles being supported by, communicating with and extending laterally from the header pipe, and said means adjustably positioning the nozzles comprising means for rotating the header pipe a half revolution for moving the nozzles from positions projecting upwardly to positions projecting downwardly from the header pipe.

3. An apparatus as in claim 2, wherein said means adjustably positioning the nozzles includes a power source having a reciprocably movable part, and a rack and pinion means connecting said movable part to the header pipe for oscillating the header pipe through an arc of approximately 180°.

4. An apparatus as in claim 1 and said means for cooling the liquid discharging from the roof comprising an adjustable baffle disposed beneath an eave of the roof for receiving and deflecting the heated liquid from the roof against a side wall of the building for heating the wall and for cooling the liquid.

5. An apparatus as in claim 1 and said means for cooling the liquid discharging from the roof comprising louvers over which the liquid is cascaded.

6. An apparatus as in claim 5 and means for receiving and conveying the cooled liquid back to the supply source or to the waste including a foundation member having a channel into which the liquid discharges.

7. An apparatus as in claim 1, comprising a gutter, means adjustably positioning the gutter in an extended position for receiving the liquid discharging from the roof or in a retracted position beneath the roof, a discharge conduit leading from the gutter, a liquid reservoir contained in the building and connected to the discharge conduit, and means for controlling the discharge of the liquid from the reservoir into the building.

8. An apparatus as in claim 1, wherein said conduit system includes a pump for supplying the heated liquid under pressure to the spray nozzles.

9. An apparatus as in claim 1, and means for cooling the liquid discharged from the roof.

10. An apparatus as in claim 1, and means for receiving and conveying the liquid back to the supply source for reheating and recycling or for discharging the liquid to waste.

* * * * *